Nov. 5, 1940.　　　C. A. OLCOTT　　　2,220,824
MEANS FOR WATER COOLING OF BRAKE DRUMS
Filed July 22, 1938　　　3 Sheets-Sheet 1

INVENTOR
CHARLES A. OLCOTT
BY HIS ATTORNEYS

Patented Nov. 5, 1940

2,220,824

UNITED STATES PATENT OFFICE 2,220,824

MEANS FOR WATER COOLING OF BRAKE DRUMS

Charles A. Olcott, West Milford, N. J.

Application July 22, 1938, Serial No. 220,827

20 Claims. (Cl. 188—264)

This invention relates to means for cooling brake drums and the like by the use of water. The invention is especially useful in connection with centrifugal machines of the belt-driven type, using friction clutch pulleys and the invention is shown and described in connection with such a device but it is to be understood that the invention may be used for any device in which the frequent application of frictional means for changing speed of movement causes heating of the friction drum and renders water cooling desirable.

One disadvantage of certain prior art devices in which water has been used for cooling brake drums is that the control valve is open and the water is allowed to flow into the drum while the clutch operating mechanism is engaged during unloading the centrifugal during which operation the machine turns very slowly and by reason of such slow turning there is not enough velocity in the water in the brake drum to cause the removal of excess water through the means provided. Such excess may overflow and eventually fall into the centrifugal basket adding undesirable moisture to the dried sugar, reaching either the sugar which may be in the basket, or leaking through the bottom of the basket to the dried sugar in the conveyor underneath.

Another disadvantage of the prior art is that the clutch operating mechanism may be put into the driving position for other purposes than driving, such as to test the operation of the parts while the back shaft is kept at rest. This also would cause an undesirable excess of cooling liquid flowing to the drum. Another disadvantage is that valves can not be relied upon to remain tight if they are operated very frequently, such as in centrifugal machines for drying high grade sugar on short cycles. Another disadvantage of the prior devices is that they use an objectionable amount of water. While the amount of water wasted in each individual machine is small it continues throughout the day, and when this flow is multiplied by the number of centrifugals operating in a plant many thousands of gallons of liquid are wasted in this way each month.

It is an object of my invention to arrange for liquid flow into the brake drum for the purpose of cooling only when the drum is rotating. Another object of my invention is to provide means for delivering water to cool a brake drum which means will be independent of the control mechanism which starts and stops the centrifugal machine so that the control mechanism may be operated without immediately and directly causing cooling water to flow.

It is another object of my invention to provide means to cause the flow of cooling water into a brake drum only when there is actual rotation of the drum.

Other advantages of the invention will appear as it is described in connection with the accompanying drawings.

In the drawings—

Figure 1:
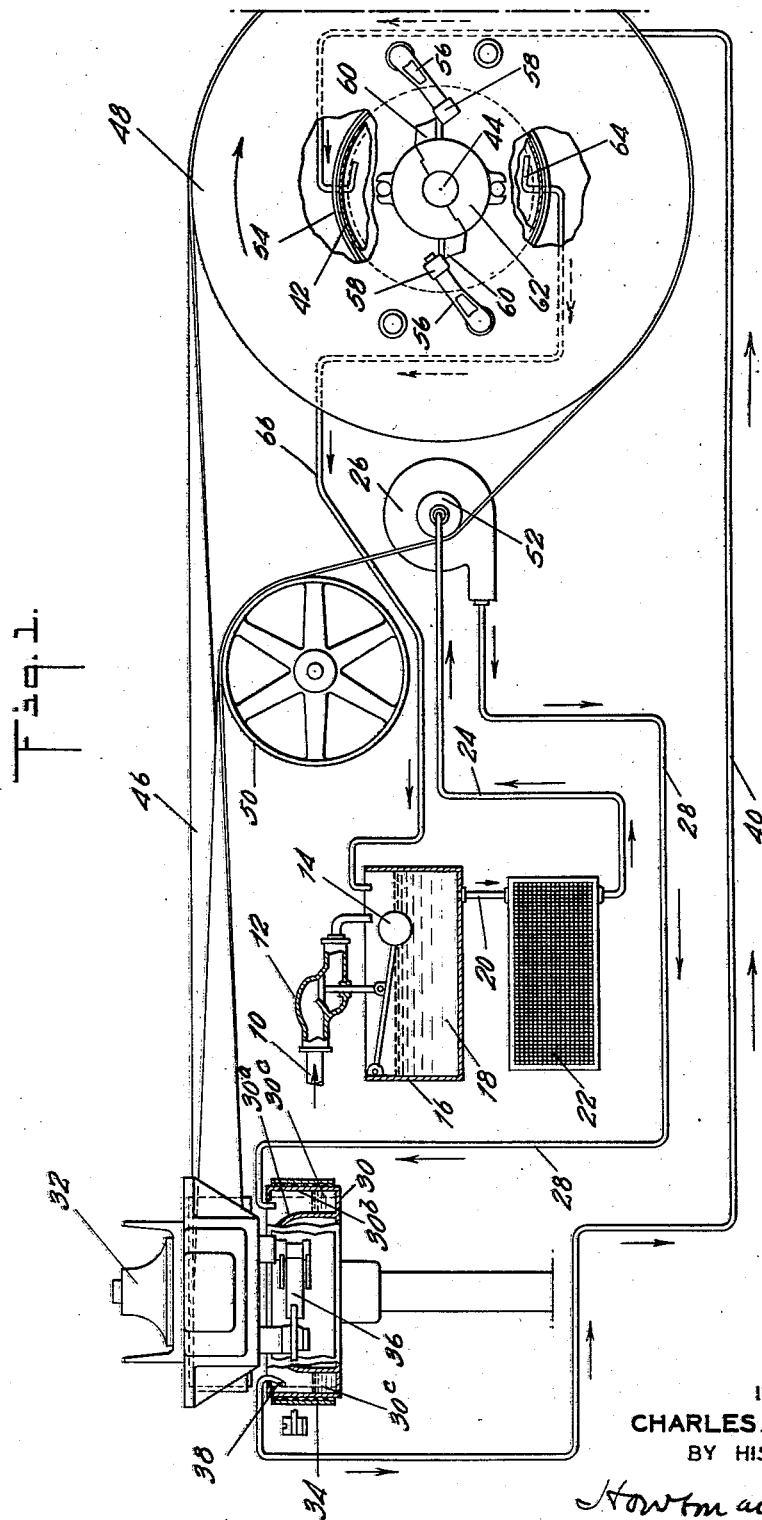
Figure 1 is a diagrammatic view of one form of apparatus embodying the principles of my invention.

Referring to Figure 1 the supply of water is obtained through a pipe 10 connected with a control valve 12 operated by a float 14 in a reservoir 16 in which the level of the water 18 is maintained by the operation of the float 14. Connected with the reservoir 16 by a pipe 20 is an air-cooler 22 which is equipped with a fan for forcing air through the cooling grids to cool the water before it issues from the cooler through pipe 24 leading to a rotary pump 26. This pump delivers through a pipe 28 to the interior of a brake drum 30 of a centrifugal machine, designated generally by the numeral 32.

Centrifugal machine 32 is driven by means of a belt 46 from a main drive pulley 48, the belt passing over an idler 50 and engaging with a pulley 52 on the main drive shaft of the pump 26. By this means the main drive pulley 48 causes operation of both the pump 26 and the centrifugal machine 32 simultaneously. When the pulley 48 stops or slows down an accompanying stoppage or reduction of speed will take place in the centrifugal machine and the pump 26. The means by which the pulley 48 is driven from the main drive shaft 44 is well known to those skilled in the art and a detailed description of the mechanism by which this drive is accomplished need not be given. It will be sufficient to say that a friction band 54, somewhat like a brake shoe, is attached to the pulley 48 in suitable manner and is caused to grip or release the friction drum 42 through mechanism controlled by arms 56 which are pivotally mounted upon the pulleys 48. On the ends of the arms 56 are rollers 58 which are adapted to be engaged by cams 60 which are mounted upon a member movable or rotatable with the friction drum 42. This member 62 is slidable along the main drive shaft 44 by manual means, not shown, whereby the engagement and disengagement of the friction drum 42 by the friction band 54 is accomplished and rotation of the drum 48 by the drive shaft 44 is brought about.

The construction of the centrifugal machine 32 forms no part of this invention and will not be described in detail. It will be sufficient to point out that the brake shoe 34 is operated by mechanism 36 to cause the shoe to press against the drum 30 in the usual manner to slow down the drum and thereby slow down the centrifugal machine.

For the purpose of this invention the brake drum 30 may be considered as hollow having parallel interior and exterior side walls 30ª and 30ᵇ respectively. It will be obvious to those skilled in the art that as the brake drum 30 rotates any water therein will be caused by centrifugal action to wall up around the inside of the exterior wall 30ᵇ as shown by the dotted line 30ᶜ. In order to remove water from the brake drum after it has walled up around the inside of the drum when a predetermined amount has been admitted there is provided a scoop 38 directed in the opposite direction to the flow or direction of rotation of the brake drum. This scoop may consist of the end of a pipe directed in the proper manner and supported in the proper position by any suitable fixed means not attached to the moving parts of the centrifugal machine. Or, a special form of scoop may be provided on the end of the pipe. Water caught in this scoop is delivered to a pipe 40 to the interior of a friction drum. This drum 42 rotates constantly with the main drive or power shaft 44 to which the drum is keyed.

A scoop 64, similar in principle and somewhat similar in construction to the scoop 38, is provided within the friction drum 42 so as to remove excess water from the drum through pipe 66 which delivers to the reservoir 18.

From the foregoing the operation of the device will be understood.

Assuming the parts to be at rest with the main shaft 44 rotating, the member 62 will be moved axially along the shaft to cause engagement of the friction band 54 with the friction drum 42, thereby causing rotation of the pulley 48 and belt 46 and starting the rotation of the centrifugal machine 32 and pump 26. As the pump 26 is brought up to speed water will be delivered to the brake drum of the centrifugal machine and the water in that drum (will wall up until a predetermined amount is within the drum) whereupon the scoop 38 will cause the excess to be removed from the drum and this excess will be delivered to the friction drum 42. Excess water will be removed from this drum by the scoop 64 which will deliver the excess to the pipe 66 to the reservoir 18. It will be apparent to those skilled in the art that the loss by evaporation, due to the operation of the various devices, will be compensated by replenishment or resupply of water to the reservoir 18 through operation of the float-controlled valve 12.

From the foregoing it will be apparent that as soon as the apparatus ceases to rotate water will cease to be delivered to the drum of the centrifugal machine and therefore there is no danger of any excess water being delivered to the drum and falling down into the sugar basket or other apparatus operated by the centrifugal device. Operation of the device only requires the resupply of such amount of water as used up by evaporation during the cooling of the brake drum. The apparatus is therefore very economical.

Figure 2:
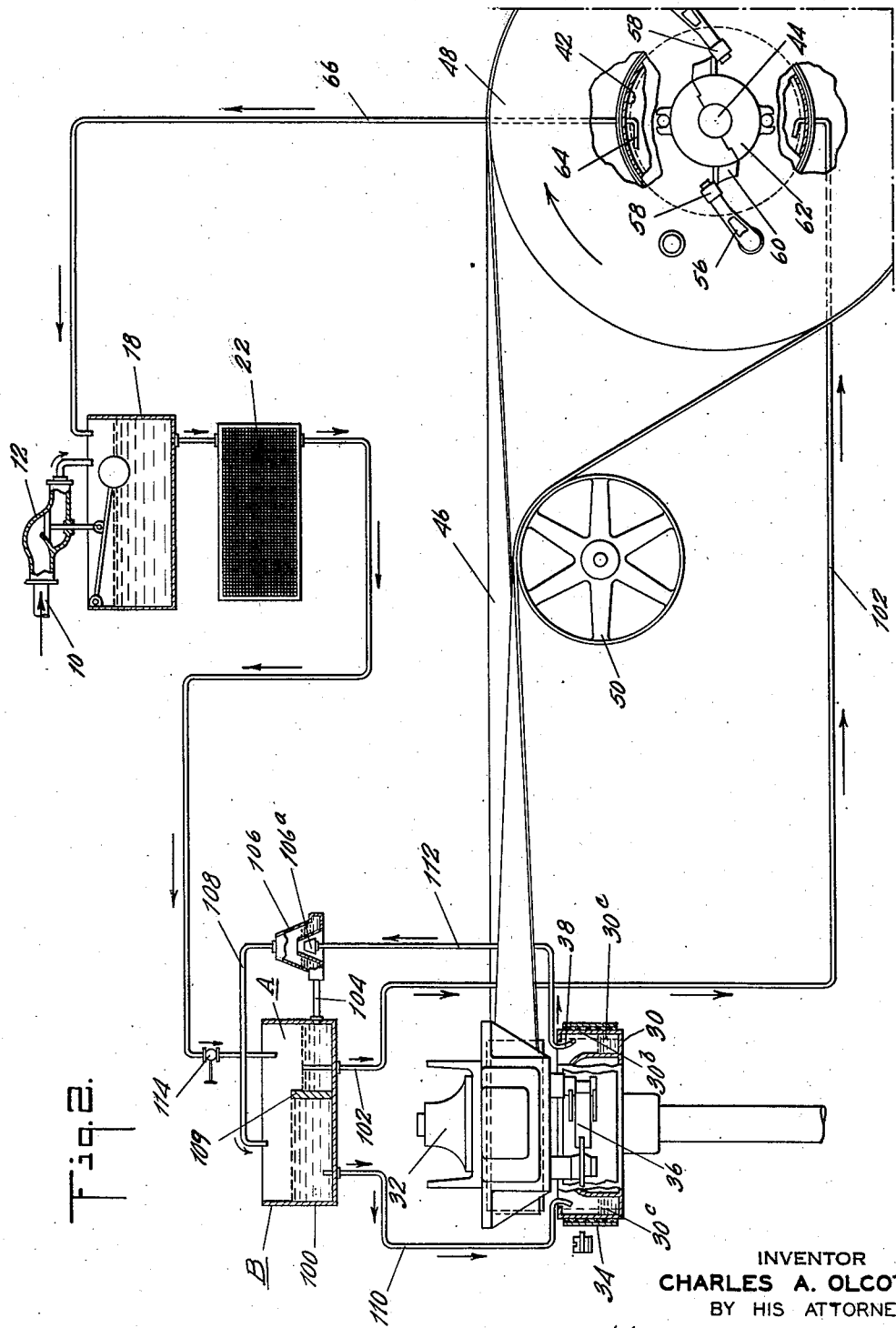
Figure 2 is a diagrammatic view of another form of apparatus embodying the principles of my invention.

Referring now to Figure 2, a second form of the invention is shown in which the objects of the invention are accomplished without the use of a rotary pump. In this form of the invention the centrifugal machine 32 is driven by the main drive pulley 48, which is operated from the main drive shaft 44 in similar manner to the form of the invention already described. The reservoir 18 and the cooling means 22 are also the same as in the previous form of the invention.

In Figure 2, the water, on leaving the cooling device 22 is delivered to the compartment A of tank 100. Water collects in this compartment up to the end of a pipe 102 which extends up from the floor of the compartment. This pipe 102 delivers to the friction drum 42 of the main drive pulley 48. As the water walls up within this friction drum the excess is removed by the scoop 64 which delivers through a pipe 66 back to the reservoir 18.

Referring again to the compartment A of the tank 100 there is connected to this compartment below the water level a pipe 104, which delivers to the casing of a water jet pump 106. This pump makes use of atmospheric pressure, along with other factors, in its operation and is designated as and sold as a syphon pump. Connected with the discharge of this pump is a pipe 108 leading to another compartment, B, of the tank 100. The compartments A and B are separated by a dam 109 of less height than the walls of the tank. Projecting only a slight distance above the floor of the tank B is a pipe 110 which delivers to the brake drum 30 of the centrifugal machine. As water accumulates in this brake drum and walls up the excess is removed during rotation of the drum by the scoop 38 through pipe 112, leading to the syphon or jet pump 106.

From the foregoing the operation may be understood. Assuming the machine to be at rest there will be in the bottom of the brake drum 30 all of the water which has not been drawn off by the scoop 38 plus the overflow from compartment B of the tank 100, which will have flowed into the drum while the machine was at rest. When the centrifugal machine rotates and has picked up considerable speed the water walls up inside of the drum and due to the fact that there was in the drum an excess of water resulting from this overflow of the compartment B there will be enough water picked up by the scoop 38 to be driven with considerable force through the pipe 12 and the jet 106ª of the pump 106. Therefore water will be drawn from the compartment A through the pipe 104 by the jet pump 106 and will be delivered through the pipe 108 to the compartment B. Thus there will be discharged into compartment B the water from that compartment which had previously collected in the drum 30 plus an amount of water sucked out of the compartment A by the pump 106. Since the flow out of the compartment B will be less rapid, than the flow into the compartment, the outflow being merely under the head of water in that compartment, the compartment will soon fill up as the excess is withdrawn from drum 30 and as the additional water is sucked from the compartment A. Thus there will continuously be discharged to compartment B more water than this compartment can hold and the compartment will overflow into the compartment A. But at the same time there is continually flowing into the compartment A a small amount of water from the pipe leading from the reservoir 18 and cooler 22. The amount of this flow will be controlled by a valve 114 which is set to give the predetermined amount of flow. Therefore it may be understood that compartment A receives continually as much water as is sucked out of it by the pump 106 and flows back in again over the dam 109, plus the amount flowing through valve 114. In other words more water is flowing out of compartment A than is flowing into it over the dam 109, and the excess will be equal to the flow through the valve 114, which excess flows out through pipe 102 to cool the friction clutch 62. Losses by evaporation, due to the operation of the cooling of the brake drum, are made up by operation of the float-controlled valve 12.

From the foregoing it will be apparent that the form of invention shown in Figure 2 possesses all the advantages of the form described in Figure 1, but in addition, it has the advantage of employing no moving parts in the water cooling system. In this connection it is to be noted that the delivery of water to the brake drum is responsive to relatively high speed rotation of the load, i. e., when it has picked up considerable speed. At speeds low enough to unload sugar-bearing materials there is not enough centrifugal force to cause residual water in the drum to wall up and start the cooling water flowing into the brake drum. Therefore the invention is unresponsive to and inactive during low speed rotation.

Figure 3:
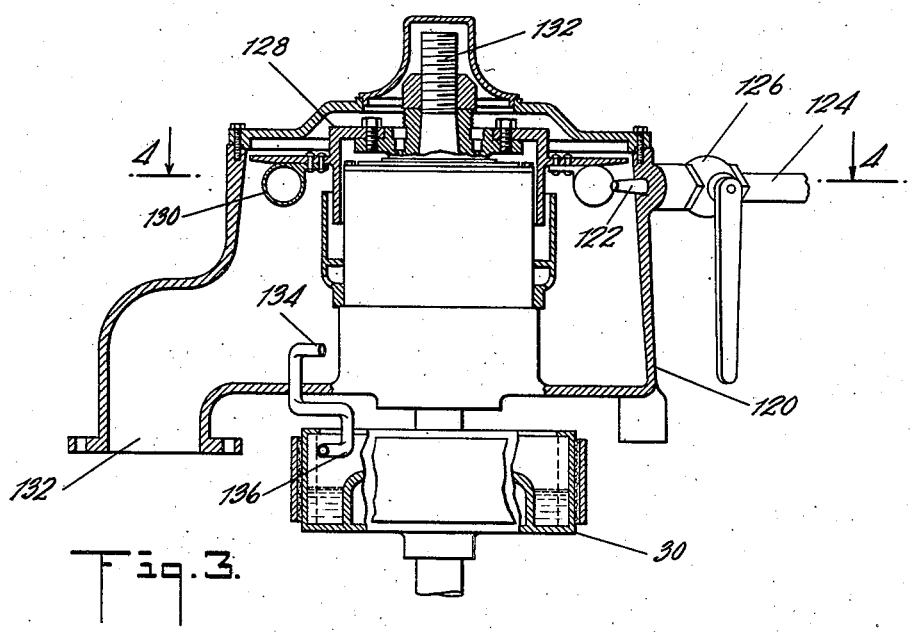
Figure 3 is a vertical section view of a third form of my invention as applied to a water-driven centrifugal machine, the section being taken on line 3—3 of Figure 4.
Figure 4:
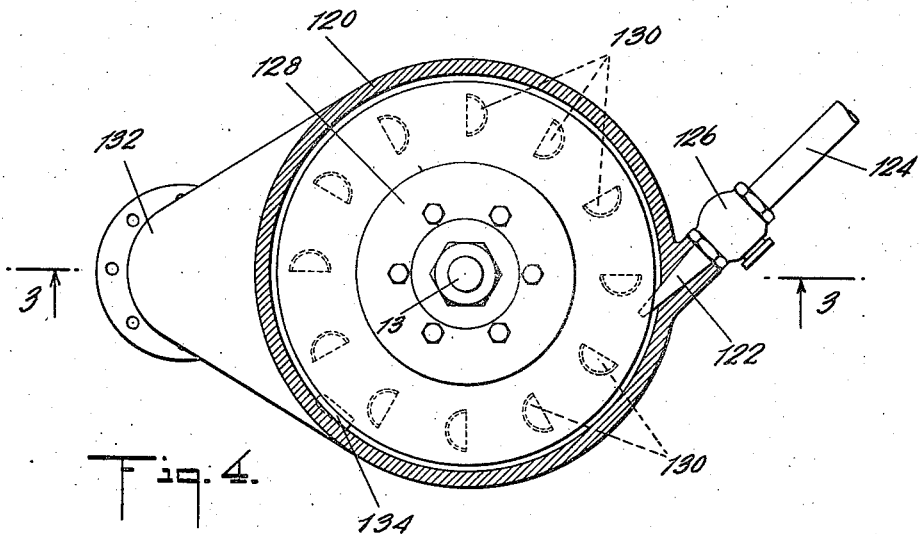
Figure 4 is a transverse section view taken along line 4—4 of Figure 3.

Referring now to the form of invention shown in Figures 3 and 4, it will be noted that this form is shown as applied to a centrifugal machine driven by water power. Since the form of the machine is conventional, except as to the application thereto of my novel means for supplying water to the brake drum, the centrifugal machine itself will not be described in detail. It will be sufficient to mention that the machine has a casing 120 into the side of which extends a jet 122 fed from a pipe 124, controlled by a valve 126. This jet 122 extends into the casing so as to project a stream of water tangentially to the rotor 128 carrying the bucket 130 against which the stream of water from the jet 122 impinges. The rotor 128 is fixedly mounted upon the centrifugal main shaft 132 which is suitably supported in bearings and has keyed thereto a brake drum 30 which is or may be of similar form to the drum shown in the machine described in connection with Figures 1 and 2. For the sake of clearness the brake operating mechanism has been omitted from Figures 3 and 4. Located within the casing 120, on the other side of the casing from the jet nozzle 122 and in the neighborhood of the outlet passage 132 is a pipe 134 which projects above the floor of the casing 120 adjacent the side walls of the casing. The end of this pipe 134 is directed in the direction opposite to the rotation of the rotor 128. The pipe 134 extends down through the floor of the casing 120 and delivers to the interior of the brake drum 30. The delivery end 136 of the pipe 134 may be considered a scoop. This scoop will be directed in the opposite direction to the rotation of the drum 30 and serves a similar purpose to the scoop in the previously described modification of the invention in the respect that it will remove from the brake drum the excess of water over that required for normal cooling. The amount required, of course, will be determined by the conditions of operation of the particular machine to which the invention is applied.

From the foregoing the operation of the device may now be understood.

Referring to Figure 4 it will be understood that when the machine is at rest or has just started rotating the water from the jet 122 striking the bucket 130 will be caught and thrown back in reverse direction causing a flow within the casing in a counter-clockwise direction while the machine is gathering speed. Since the end of the pipe 134 is directed in the direction of flow of the water during this starting operation no water will flow through the pipe 134 into the brake drum. According to well known principles of operation of water-driven apparatus of the type described, when the machine reaches speed the linear velocity of the bucket 130 is more than half the velocity of the jet issuing from nozzle 122. The result of this condition is that the escaping water no longer runs in a counter-clockwise direction but flows with relatively small velocity in a clockwise direction but sufficiently rapidly to wall up against the side of the casing to cover and flow into the opening in the pipe 134 on its way to the outlet 132 from the casing 120. The water which finds its way to the pipe 134 will flow into the brake drum and wall up therein because this flow of water to the drum takes place only when the machine has reached high speed. When the predetermined required amount of water is within the brake drum 30 then the scoop 136 will catch any excess and will cause it to be expelled through the end 134 of the pipe. Due to the velocity with which the brake drum rotates it is impossible for more water to flow into the drum than will bring it up to the level of the scoop and thus the water will cease to flow into the drum as soon as the predetermined amount has been received.

To stop the machine the operator shuts the valve 124 and as the machine loses speed the water within the casing 120 drains off through the discharge outlet 132. There being no more water in the casing 120 none can flow down into the brake drum and flood it. Even if the operator should apply the brake without closing the valve 126 no more water would flow into the brake drum because the excess water in the wheel case 120 would then flow in a counter-clockwise direction and would not find the opening in the pipe 134.

Water-driven centrifugals are usually run on cycles relatively long compared with those of belt or electrically driven machines and for this reason the circulation of water is not necessary in the brake drum. The presence of water at any temperature assures that the temperature of the drum will not rise much above 212° which is not objectionable. If the water should rise nearly to 212° more of it would be vaporized but an equal amount would, at the same time, be added to the brake drum through the pipe 134 to keep the drum filled with an adequate amount of relatively cold water.

It will be obvious to those skilled in the art that instead of the pipe 134 in Fig. 3 performing the function of both a delivery pipe and a scoop for removal of excess water from the drum 30, two pipes might be used, one being to deliver water to the drum and the other to remove excess and to discharge it in some suitable manner, as into the discharge outlet 132 of the machine.

From the foregoing it may be observed that my invention as applied to water-driven centrifugal machines has the advantage—in common with the forms of the invention described in connection with Figures 1 and 2—that the delivery of water to the brake drum for purposes of cooling is responsive to the rotation of the centrifugal machine and is not directly responsive to the manipulation or operation of devices for the purpose of starting and stopping the machine. All forms of the invention have the characteristic feature of adding an adequate supply of cool water to the brake drum to compensate for evaporation while at the same time preventing overflow of the cooling water and providing for the removal of excess water.

Many modifications within the scope of my invention will occur to those skilled in the art. Therefore I do not limit the invention to the specific forms shown and described.

I claim—

1. In combination, a centrifugal machine, a rotary drum of a friction brake rotating with said machine and adapted to contain cooling liquid, means to withdraw all over a predetermined amount of liquid from said drum, means including a liquid jet pump operated by liquid from said withdrawing means to deliver cooling liquid to said drum.

2. In combination, a centrifugal machine, a rotary drum of a friction brake rotating with said machine and adapted to contain cooling liquid, means to withdraw all over a predetermined amount of liquid from said drum, means including a pump operable in response to rotation of said drum to deliver cooling liquid to said drum, driving means for said machine including a friction clutch having a rotating drum adapted to contain cooling liquid, means associated with said brake drum to cause delivery of at least a portion of the brake drum cooling liquid to said clutch drum, means to withdraw liquid from said clutch drum for the purpose of returning at least a portion of it to said brake drum, and a cooling device between said brake drum and clutch drum for cooling said liquid.

3. In combination, a centrifugal machine, a rotary drum of a friction brake rotating with said machine and adapted to contain cooling liquid, means to withdraw all over a predetermined amount of liquid from said drum, means including a pump operable in response to rotation of said drum to deliver cooling liquid to said drum, a compartment fed by said pump for supplying liquid to said brake drum, driving means for said machine including a friction clutch having a rotating drum adapted to contain cooling liquid, and a compartment for supplying cooling liquid to said clutch drum, means to replenish liquid lost by evaporation during operation of the apparatus, said means delivering to said second compartment, said second compartment also being fed by liquid withdrawn from said clutch drum and by overflow from said first compartment.

4. In combination, a centrifugal machine, a rotary drum of a friction brake rotating with said machine and adapted to contain cooling liquid, means to withdraw all over a predetermined amount of liquid from said drum, a compartment to which said withdrawn liquid is delivered for redelivery to said drum, driving means for said machine including a friction clutch having a rotating drum adapted to contain cooling liquid, means to remove all but a predetermined amount of liquid from said clutch drum, a compartment to which the liquid withdrawn from said clutch drum is delivered for redelivery to said clutch drum, said compartments being associated so that one compartment may overflow into the other, means to cool said cooling liquid, and means to make up loss of cooling liquid occurring during operation of said brake and clutch.

5. In combination, a centrifugal machine, a rotary drum of a friction brake rotating with said machine and adapted to contain cooling liquid, means to withdraw all over a predetermined amount of liquid from said drum, a compartment to which said withdrawn liquid is delivered for redelivery to said drum, driving means for said machine including a friction clutch having a rotating drum adapted to contain cooling liquid, means to remove all but a predetermined amount of liquid from said clutch drum, a compartment to which the liquid withdrawn from said clutch drum is delivered for redelivery to said clutch drum, said compartments being associated so that said first compartment may overflow into said second compartment, means to deliver a greater amount of liquid to said first compartment than is drawn off for delivery to said brake drum.

6. In combination, a centrifugal machine, a rotary drum of a friction brake rotating with said machine and adapted to contain cooling liquid, means to withdraw all over a predetermined amount of liquid from said drum, a compartment to which said withdrawn liquid is delivered for redelivery to said drum, driving means for said machine including a friction clutch having a rotating drum adapted to contain cooling liquid, means to remove all but a predetermined amount of liquid from said clutch drum, a compartment to which the liquid withdrawn from said clutch drum is delivered for redelivery to said clutch drum, means to mix the liquids from said brake and clutch drums and means to cool said liquids.

7. In combination, a centrifugal machine, a rotary drum for a friction brake rotating with said machine and adapted to contain cooling liquid, means to deliver cooling liquid to said drum, means to withdraw all over a predetermined amount of said liquid from said drum, driving means for said machine including a friction clutch having a drum adapted to contain liquid, means to deliver cooling liquid to said clutch drum, means to withdraw all but a predetermined amount of liquid from said clutch drum, said means for delivering cooling liquid to said brake drum being constructed and arranged to operate only while said machine is rotating.

8. In a rotary machine, frictionally engaging surfaces including a brake drum adapted to contain cooling fluid, driving means for said machine including frictionally engaging members, one of said members being formed to hold cooling fluid, means providing a continuous flow of cooling fluid to said one of said members, and means responsive to rotation of said brake drum to divert a portion of said flow of cooling fluid into said brake drum.

9. In combination, a centrifugal machine, a rotary drum of a friction brake rotating with said machine and adapted to contain cooling liquid, means to withdraw all over a predetermined amount of liquid from said drum, a compartment to which said withdrawn liquid is delivered for redelivery to said drum, driving means for said machine including a friction clutch having a rotating drum adapted to contain cooling liquid, means to remove all but a predetermined amount of liquid from said clutch drum, a compartment to which the liquid withdrawn from said clutch drum is delivered for redelivery to said clutch drum, means which becomes operative upon rotation of said machine to cause flow of liquid from one compartment to the other.

10. In combination, a centrifugal machine, a rotary drum of a friction brake rotating with said machine and adapted to contain cooling liquid, means to withdraw all over a predetermined amount of liquid from said drum, driving means for said machine including a friction clutch having a rotating drum adapted to contain cooling liquid, means to remove all but a predetermined amount of liquid from said clutch drum, separate compartments to which the liquid withdrawn from said brake and clutch drums is delivered and from which liquid may flow to said clutch and brake drums, and means causing flow of the liquid between said compartments.

11. In combination, a centrifugal machine, a rotary drum of a friction brake rotating with said machine and adapted to contain cooling liquid, means to withdraw all over a predetermined amount of liquid from said drum, driving means for said machine including a friction clutch having a rotating drum adapted to contain cooling liquid, means to remove all but a predetermined amount of liquid from said clutch drum, separate compartments to which the liquid withdrawn from said brake and clutch drums is delivered and from which liquid may flow to said clutch and brake drums, and means which becomes operative upon rotation of said machine to cause flow of liquid from one compartment to another.

12. In a rotary machine, a driven load, frictionally engaging members, at least one of which revolves with the load and which may be brought to rest by direct frictional engagement with the other, liquid-containing means associated with one of said members, means including a supply of liquid for cooling said liquid-containing means, and means operative in response to and only during rotation of the load for causing flow of cooling liquid to said liquid-containing means.

13. In belt-driven rotary apparatus a centrifugal machine for drying sugar-bearing materials including a brake shoe and an open brake drum, driving means for said machine including frictionally engageable members, one of said members being formed to hold cooling liquid, cooling means for said liquid, means to cause circulation of cool liquid within said brake drum and liquid-holding member and cooling means, said circulating means being responsive to high speed rotation of said centrifugal machine and being inactive while said machine is rotating at a speed low enough for unloading.

14. Centrifugal apparatus including a centrifugal machine for drying sugar-bearing materials, driving means for said machine including a friction clutch, friction braking means for said machine including an unenclosed container for cooling liquid, means to deliver cooling liquid to said brake means and clutch, means operative only during rotation of the said brake means to cause continuous circulation of the cooling liquid, said means being unresponsive to rotation of said brake means at a speed low enough for unloading.

15. In combination, a centrifugal machine for drying sugar-bearing materials, an open rotary drum of a friction brake rotation with said machine constructed and arranged to hold cooling fluid, means directly engaging said brake drum for bringing said drum to rest, means to deliver cooling fluid to said drum, said delivery means being active only while said drum is rotating, means to withdraw all over a predetermined amount of liquid from said drum, means connected to return said withdrawn liquid to said drum through said delivering means, said means operating only during rotation of said drum, and being inoperative during rotation of said drum at a speed low enough for unloading.

16. In a combination, a centrifugal machine for drying sugar-bearing materials, an open rotary drum of a friction brake rotating with said machine constructed and arranged to hold cooling fluid, means directly engaging said brake drum for bringing said drum to rest, means to deliver cooling fluid to said drum, said delivery means being active only while said drum is rotating, means to withdraw all over a predetermined amount of liquid from said drum, means connected to return said withdrawn liquid to said drum through said delivering means, said last-claimed means operating only during high speed rotation of said drum and being inactive during rotation at a speed low enough for unloading, and means to cool said returning liquid.

17. In combination, a centrifugal machine, an open rotary drum of a friction brake rotating with said machine and adapted to contain cooling liquid, means to withdraw all over a predetermined amount of liquid from said drum, means operable in response to high speed rotation of said drum to deliver cooling liquid to said drum but unresponsive to rotation at a speed low enough for unloading.

18. In combination, a centrifugal machine, a rotary drum of a friction brake rotating with said machine and adapted to contain cooling liquid, means to withdraw all over a predetermined amount of liquid from said drum, syphoning means operable in response to rotation of said drum to deliver cooling liquid to said drum, driving means for said machine including a friction clutch having a rotating drum adapted to contain cooling liquid, means associated with said brake drum to cause delivery of at least a portion of the brake drum cooling liquid to said clutch drum, and means to withdraw liquid from said clutch drum for the purpose of returning at least a portion of it to said brake drum.

19. In a rotary machine for drying sugar-bearing materials, a driven load, frictionally engaging means for changing the rate of rotation of the load and including a braking surface engaging an open rotating drum containing cooling fluid, means including a supply of cooling fluid for cooling said drum, means responsive to high speed rotation of the load for causing cooling fluid to flow to said drum, said last-mentioned means being inoperative during rotation of the load at a speed low enough for unloading, and stationary inlet and outlet ports through which said cooling fluid comes to and leaves said drum.

20. In a rotary machine, a driven load, frictionally engaging means for changing the rate of rotation of said load, said means including a liquid containing member engageable by a frictional surface of another member with concomitant generation of heat, means including a supply of liquid for cooling said frictional means, means operative only during high speed rotation of the load for causing flow of the cooling liquid to the hot surface of said frictional means, said last-claimed means being inoperative during rotation of the load at a speed low enough for unloading.

CHARLES A. OLCOTT.

CERTIFICATE OF CORRECTION.

Patent No. 2,220,824.   November 5, 1940.

CHARLES A. OLCOTT.

It is hereby certified that error appears in the printed specification of the above numbered patent requiring correction as follows: Page 5, first column, line 62, claim 15, for the word "rotation" read --rotating--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.